US007190146B1

(12) United States Patent
Kureck

(10) Patent No.: US 7,190,146 B1
(45) Date of Patent: Mar. 13, 2007

(54) CONTROL SYSTEM AND METHOD FOR AN OVERHEAD BRIDGE CRANE

(75) Inventor: Aaron S. Kureck, Nashotah, WI (US)

(73) Assignee: Magnetek, Inc., Milwaukee, WI (US)

( * ) Notice: Subject to any disclaimer, the term of this patent is extended or adjusted under 35 U.S.C. 154(b) by 383 days.

(21) Appl. No.: 10/643,161

(22) Filed: Aug. 18, 2003

(51) Int. Cl.
*H02P 7/00* (2006.01)
*H02P 5/50* (2006.01)
*B66C 13/30* (2006.01)

(52) U.S. Cl. .......................... 318/799; 318/98; 318/71; 318/432; 212/171; 212/173

(58) Field of Classification Search ..................... None
See application file for complete search history.

(56) References Cited

U.S. PATENT DOCUMENTS 4,965,847 A * 10/1990 Jurkowski et al. .......... 318/366
5,167,401 A * 12/1992 James et al. .................. 318/66
5,210,473 A * 5/1993 Backstrand .................. 318/63
5,294,066 A 3/1994 Lacour
5,319,292 A 6/1994 Backstrand
5,343,134 A * 8/1994 Wendt et al. ............... 318/757
5,548,198 A * 8/1996 Backstrand ................. 318/799
5,625,262 A * 4/1997 Lapota ........................ 318/71
5,866,997 A * 2/1999 Sorsa et al. ................... 318/66
5,941,305 A 8/1999 Thrasher et al.
6,041,856 A 3/2000 Thrasher et al.
6,131,557 A 10/2000 Watson
6,417,644 B2 * 7/2002 Hammond et al. ......... 318/759
6,463,812 B2 10/2002 Dubois
RE37,976 E * 2/2003 Hiramatsu .................. 254/274
6,564,548 B2 5/2003 Nishimura et al.
6,720,751 B2 * 4/2004 Plasz et al. ................. 318/567
2002/0033481 A1 3/2002 Kemppainen

FOREIGN PATENT DOCUMENTS

EP 491 200 A1 6/1992

* cited by examiner

*Primary Examiner*—Lincoln Donovan
*Assistant Examiner*—Eduardo Colon Santana
(74) *Attorney, Agent, or Firm*—Waddy & Patterson, P.C.; Phillip E. Walker

(57) ABSTRACT

Included herein is a system and method for controlling a velocity vector of an overhead crane. A motor is attached to the crane and is positioned to move the overhead crane and has an output vector including a rotational direction and a rotational speed. A variable frequency drive is positioned to transfer voltage and current at a frequency to the motor. A processing unit converts the output vector to an amount of voltage and current at a given frequency and can instruct the variable frequency drive to send a frequency to the motor at a frequency substantially equal to the frequency at which the motor is presently rotating. This creates a speed match for the motor reducing spikes during operation of the motor and substantially eliminates open circuit decay. A hydraulic brake operates in connection with the processing unit and the variable frequency drive to slow the crane without driving the motor into the brake.

22 Claims, 9 Drawing Sheets

CONTROL SYSTEM AND METHOD FOR AN OVERHEAD BRIDGE CRANE

BACKGROUND OF THE INVENTION

The present invention relates generally to the control of overhead cranes, and more particularly, to a system and method for controlling the speed, direction, and braking of an electric overhead bridge traveling crane.

As shown in FIG. 6, a conventional overhead crane 200 typically includes a horizontal section known as a "bridge" 204 that moves the suspended load across a horizontal span 202 over the work area. Movement of the bridge 204 is provided by a reversible, variable-speed electric motor coupled by conventional electromechanical transmission components to the bridge 204. The speed and direction of the motor, in turn, is powered and controlled by a variable frequency motor drive (VFD).

Conventionally, crane bridges are controlled by an operator using manual controls. A master switch (FIG. 2) is used by the crane operator to command motion, direction, torque/speed, and acceleration. A foot-operated hydraulic braking system (FIG. 3) is employed for slowing or stopping movement of the crane independently of the motor control. The hydraulic brake is operated in a fashion similar to that of an automobile where a master cylinder is operated by a foot pedal which in turn transmits hydraulic pressure to engage the brake or brakes. The hydraulic pressure and braking torque developed by the master cylinder is proportional to the amount of force applied to the foot pedal. Because braking on these conventional overhead bridge cranes is controlled by the operator, the crane is essentially coasting when the crane operator moves the master switch to the neutral position.

Conventional crane control systems also use a braking system that includes a ramped deceleration time associated with the variable frequency drive. Most of the traditional crane controls use techniques and systems that are not efficient and also cause abnormally large amounts of destructive forces on the motor and drive systems of these conventional overhead cranes.

For example, conventional crane controls use "plugging" as a technique for controlling the movement of the crane. Plugging is a term that has carried over from traditional contactor controls where a motor is connected directly to the line through the use of reversing contactors. Plugging is defined as a control function that provides braking by reversing the motor line voltage polarity, or phase sequence, so that the motor develops a counter torque that exerts retarding force. This method of slowing or stopping the crane is inherently detrimental to the motor and controls as it subjects them to several times the amount of nominal current. See Charts 1 and 2 below for an example of this detrimental effect. Chart 1 shows a representation of conventional voltage and current spikes associated with supplying a voltage and current with the same polarity as the voltage and current present within motor rotating in a given direction. Chart 2 shows a representation of conventional current and voltage spikes associated with supplying a reversed plurality voltage and current to a motor traveling in a given direction. This is also known as reverse plugging.

CHART 1

| Reversing contactor (Same Direction) | | | |
|---|---|---|---|
| Motor - 3 Phase Induction Motor | | Chart Information | |
| Rated Voltage - 460 Vac | Rated Current - 3.0 Amps | A1 - Logic 0 or 1 | Forward contactor - Open/Closed |
| Rated RPM - 1750 | Rated Horsepower - 2 | A2 - Logic 0 or 1 | Reverse contactor - Open/Closed |
| Design - NEMA B | Frame - 145 TCZ | CH1 - 100 Vac/Division | Motor Voltage - T2, T3 |
| TENV | Continuous Duty | CH2 - 10 mv/Amp | Motor Current - T3 |

CHART 2

| Reversing contactor (Opposite Direction - Reverse Plugging) | | | |
|---|---|---|---|
| Motor - 3 Phase Induction Motor | | Chart Information | |
| Rated Voltage - 460 Vac | Rated Current - 3.0 Amps | A1 - Logic 0 or 1 | Forward contactor - Open/Closed |
| Rated RPM - 1750 | Rated Horsepower - 2 | A2 - Logic 0 or 1 | Reverse contactor - Open/Closed |
| Design - NEMA B | Frame - 145 TCZ | CH1 - 100 Vac/Division | Motor Voltage - T2, T3 |
| TENV | Continuous Duty | Ch2 - 10 mv/Amp | Motor Current - T3 |

Also, conventional controls do not facilitate adjustments to the speed to the crane. In fact, conventional crane controls lack efficient and non-destructive speed adjustment even when the user desires a speed adjustment in the same direction in which the crane is traveling. For example, in a traditional reversing contactor control system, the contactors are de-energized and the circuit to the motor is opened when the directional switch is in the neutral position. In this position, the crane will be coasting at some speed. During this coasting period, the residual voltage and current in the motor will decay as the rotor demagnetizes. The amount of time for the voltage and current to decay is dependent on several variables: motor horsepower, motor type, load, temperature, etc. Usually the voltage and current have completely decayed prior to a desired speed change by a user of the crane. Also, after some period of time, the speed of the crane, and hence the motor speed, can decrease from friction or the application of a brake.

When a user decides to alter the velocity of a crane using a conventional control system, the user activates the conventional control system from a neutral position. In turn, line voltage and frequency are applied to the coasting motor. When the motor is re-energized with the desired voltage and frequency corresponding to a desired speed, the rotation of, and hence the frequency and voltage within, the motor is not synchronous with that of the line voltage and frequency being applied by the user. In other words, the residual voltage and frequency in the motor is not equal to the desired voltage and frequency being applied by the user.

The motor follows the direction and frequency of the line voltage being applied to it. As such, the applied frequency will either accelerate or decelerate the motor, and the crane, to follow the commanded speed and direction from the applied frequency. This can cause sizeable current transients, vibrations, and significant wear to the motor, controls and machinery over time. The effects of the transients, vibrations, and significant wear can be more than tripled when the controls are reversed plugged. Charts 1 and 2 above illustrate this detrimental effect on a motor with an inertia load, the motor controlled by a set of reversing contactors.

Thus, there is a need an overhead crane bridge control system that effectively and efficiently controls the velocity and direction of the crane without undo wear to the motor, controls, and machinery of the crane.

SUMMARY OF THE INVENTION

The present invention is a system and method for controlling movement and braking of an overhead crane bridge. In one embodiment, the system includes a variable speed electric motor, a variable frequency drive and a processing unit. The motor is mechanically coupled to power the movement of the overhead crane. The variable frequency drive (VFD) is operatively connected to the motor to provide operating voltage, current, and frequency to the motor. The processing unit determines the rotational direction and a rotational speed of the motor, sometimes referred to as the motor "output vector." The VFD and processing unit include software that responds to control inputs to provide control signals to the VFD. More specifically, the processing unit is responsive to a master switch control signal to provide operating voltage and current to the motor when the master switch is moved from a neutral position to either of the forward or reverse positions. The system provides a speed match by maintaining, or adjusting, the frequency level sent to the motor to match the frequency read from the motor output vector.

A master control switch is operatively connected to the variable frequency drive to regulate the direction of movement and the velocity of the crane. The positioning of the control switch determines the level of voltage and the level of current transferred by the variable frequency drive to the motor. Included is a brake operatively connected to the motor and to the variable frequency drive to decrease the velocity of the crane.

Also disclosed is a method of using a motor to control the direction of movement and the velocity of an overhead bridge crane. The motor has a rotational direction and a rotational speed. The method comprises determining the direction of movement and the velocity of the crane by monitoring the rotational direction and the rotational speed of the motor. The method includes converting the rotational direction and rotational speed of the motor to the amount of voltage, the amount of current, and the frequency within the motor and regulating a level of voltage, a level of current, and a frequency sent to the motor to control the direction of movement and the velocity of the crane. This method includes sending voltage, current, and frequency to the motor from a variable frequency drive. This voltage, current, and frequency are substantially equal to the voltage, current, and frequency within the motor as determined from a sensor located in the motor. As such, a substantially consistent voltage, current, and frequency are maintained within the motor during operation of the crane at zero torque within the motor.

Also included in the method is a step of corresponding the frequency level sent to the motor from the variable frequency drive to the motor to the frequency presently in the motor before adjusting the level of voltage and the level of current sent to the motor to alter the speed of the motor and crane.

A purpose of this invention is to control an electric overhead bridge traveling crane that utilizes a hydraulic brake to slow or stop the motion of the bridge. The use of a variable frequency drive eliminates the need to reverse the voltage polarity through the use of reversing contactors. The voltage and frequency applied to the motor by the variable frequency drive can be controlled through software. This invention allows the crane operator to apply an adjustable amount of retarding torque to the motor by simply moving the master switch to the direction opposite of the cranes motion. The maximum amount of retarding torque that can be applied can be limited by a parameter in the software. This helps to insure a smooth transition from coasting to slowing down and is non-destructive to the controls or the crane itself.

Through the use of this invention, it is possible to keep the rotor magnetized and apply approximately zero torque to the motor shaft while the crane is coasting. This overcomes the problems inherent in the open circuit scenario previously described. As such, this invention allows virtually no open circuit voltage decay due to the ability of the system to substantially maintain the active frequency in the motor, and thus keep the motor magnetized. The invention can accomplish this by determining the active frequency in the motor and transferring a frequency level approximately equal to that active frequency presently in the motor from the VFD.

The current is approximately equivalent to the no load current rating of the motor during this time. Furthermore, the current is reduced significantly in comparison to conventional control systems by knowing in advance the speed of the motor shaft, and as a result the frequency, current and voltage, and matching that frequency when resuming control of the motor to alter the speed of the crane by the application of adjusting levels of frequency, current and voltage. Please see Chart 3 for a representation of the frequency, current and voltage in a control system made in accordance to this invention.

Chart 3 shows the voltage current spikes of one embodiment of the current invention when a voltage and a current are applied to a motor containing a voltage and current with an opposite polarity. Chart 3 can be compared to Charts 1 and 2 to emphasize the reduction in stress to the motor, drive system, and crane when the novel control system of this invention is used in comparison to conventional systems.

CHART 3

VFD (Opposite Direction - Reverse Plugging)

| Motor Nameplate Information - 3 Phase Induction Motor | | Chart Information | |
|---|---|---|---|
| Rated Voltage - 460 Vac | Rated Current - 3.0 Amps | A1 - Logic 0 or 1 | Footbrake Switch - Open/Closed |
| Rated RPM - 1750 | Rated Horsepower - 2 | | |
| Design - NEMA B TENV | Frame - 145 TCZ Continuous Duty | CH1 - 100 Vac/Division | Motor Voltage - T2, T3 |
| | | CH2 - 10 mv/Amp | Motor Current - T3 |
| | | CH3 - 5 V/Division (5 V = 50%) | Motor Torque (Bi-polar) |

The hydraulic brake is operated by a foot pedal which forces hydraulic fluid from the master cylinder of the brake. When the crane operator steps on the foot pedal, two things can occur in the controller software. First, a contract closure can be made in the hydraulic brake circuit when the crane operator applies pressure to the foot pedal. The contact closure can be in the form of a micro switch attached to the pedal or a hydraulic pressure switch in the hydraulic circuit.

Next, the electrical signal can be routed to the variable frequency drive to signal the software that the crane operator has applied the hydraulic brake or brakes. When this is the case, the software will prevent the motor from driving into the brakes, which can also be called brake stand prevention. This saves wear and tear on the controls, brakes and the crane itself. This is possible since the variable frequency drive knows the speed and the direction the crane is moving by the pulse train it is receiving from the motor shaft encoder circuit.

A control, or master, switch performs two separate functions in the control system. First, included is a set of contacts operated by a camshaft. When the master switch is moved from the neutral position in either direction, the contacts close. This set of contacts is used as a run command to the variable frequency drive.

Second, the master switch provides a continuously variable voltage to the variable frequency drive, which internally correlates to a torque reference by using predetermined conversion equations for a given set of parameters. The magnitude of the torque reference is proportional to the position of the master switch, which gives the crane operator the capability to control the torque over the full range of speeds, or from minimum to maximum deflection. Not only is the torque exerted at the motor shaft proportional to the master switch position, but the torque is regulated at that proportional value as the crane accelerates or decelerates.

The end result is that as the torque is applied to the motor, the crane begins to move in the commanded direction at a speed proportional to the commanded amount of torque. As more torque is applied, the crane will accelerate or decelerate faster. The maximum speed can be limited by a parameter in the software. Once the maximum speed is reached, the internal torque reference can automatically be reduced to prevent the crane from accelerating beyond the maximum speed setting regardless of the master switch position.

The amount of time for the crane to accelerate from zero speed to maximum speed is dependent on the amount of torque reference given through the master switch. If a very slow speed and acceleration is required, then a very fine movement of the master switch in the desired direction will yield those results. This is very helpful where a rapid acceleration would cause load swings.

Some of the features of the current invention include a foot pedal micro switch input that is connected to or incorporated in the software. This micro switch has the ability to adjust the power supply to the motor and movement mechanisms of the crane when the brake is applied. Variable torque reverse plugging is also possible. Variable torque reverse plugging, which has a torque that is limited by predetermined torque ranges, includes motor assisted braking. Another feature is brake stand prevention, which prevents the motor from driving into the brake when the brake is applied by disengaging the motor shaft output when the brake is applied. As such, brake stand prevention saves brake wear and tear.

Also included are several control features and programmable features emphasizing the breadth of control a user has over the crane, as well as the implementation of safety features. For example, the invention can include programmable speed and torque limits to limit the speed, acceleration, and deceleration of the crane. Also, the reduction of magnetic field decay in the motor prior to a power input increases the life of the control and operating systems as well as reducing electrical spikes in the system.

Control features include the smooth conversion, or transition, between speeds for the crane. Control features also include connecting the change of speed impulse to the motor at the same speed that the motor and crane are operating, which can also be described as a speed search. The full independent control of the crane by the operator allows the start and stop speed to be independent of the acceleration and deceleration time. The direct proportionality between the torque applied to the motor and the master control, or switch, position allows the operator direct control of the speed.

Another advantage disclosed herein is the control system can be retrofitted into conventional crane systems. The control system can be implemented in existing crane systems to control the movement of the crane. For example, the present invention can be attached to the motor and control inputs of currently existing overhead bridge cranes to control the velocity vector of those conventional cranes. This can greatly increase the control a user has over the conventional crane as well as reduce the wear and tear on the crane and specifically the motor of the crane.

Therefore, it is a general object of the present invention to provide a system for controlling the movement of a crane.

Another object of the present invention is to provide a method of controlling the direction of movement and the velocity of an overhead bridge crane.

Still another object of the present invention is to provide a system for controlling a velocity vector of an overhead bridge crane using a speed matching variable frequency drive and processing software.

Yet another object of the present invention is to provide a system for controlling the velocity of an overhead crane with a variable frequency drive and a hydraulic brake.

Still yet another object of the present invention is to provide a method and system for reducing wear and tear and determent to a motor and crane during the variance of the velocity of the crane.

Other further objects, features, and advantages of the present invention will be readily apparent to those skilled in the art upon a reading of the following disclosure when taken in conjunction with the accompanying drawings.

DESCRIPTION OF THE PREFERRED EMBODIMENTS

Figure 1:
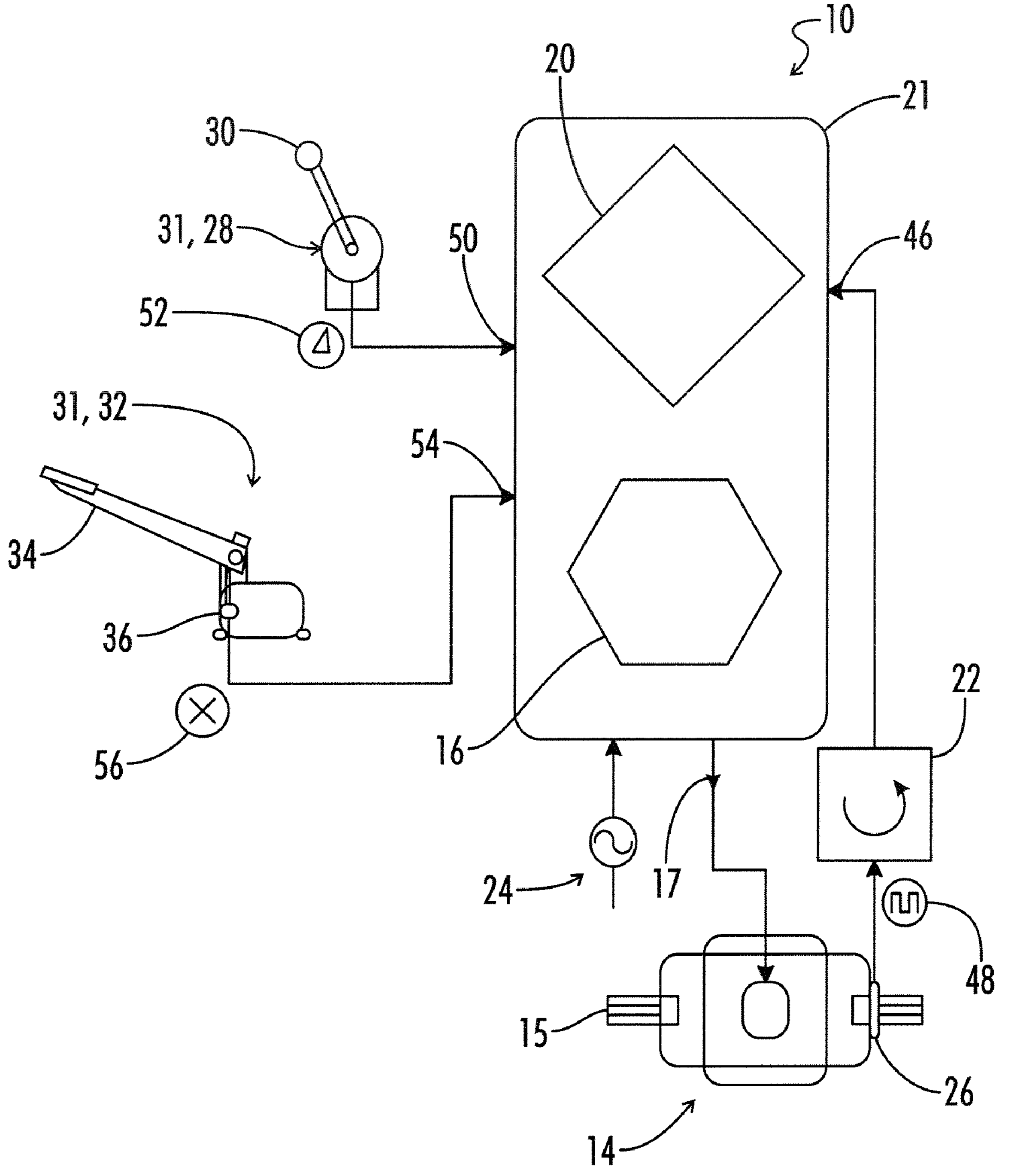
FIG. 1 is a schematic representation of one embodiment of a system for controlling an overhead crane.

Referring now generally to FIGS. 1–6, a system for controlling an overhead crane is shown and generally designated by the numeral 10. The system 10 is for controlling a velocity vector 12, or the speed and direction of traverse) of an overhead crane 200. The overhead crane 200 can also be described as an overhead bridge crane 200. The system 10 includes a motor 14, a variable frequency drive 16, and a processing unit 20.

The motor 14 is operatively coupled and positioned to move the overhead crane 200. The motor 14 functionally generates an output vector 22 that includes a rotational direction and a rotational speed, which can also be described as speed and direction feed back from the motor 14 and more specifically the sensor 26. The motor 14 can be connected to the crane 200 by conventional transmission drive components. The variable frequency drive 16, and operatively the motor 14, is attached to a power source 24, which can also supply the power for the other components of the system 10.

The variable frequency drive 16 is electrically connected to the motor 14 to provide operating voltage and current. The variable frequency drive 16 can be any conventional or variable frequency drive known in the art to vary outputs of voltage, current, and frequency for the operation of motors.

In a preferred embodiment, the variable frequency drive 16 and processing unit 20 are contained within a motor drive 21, which can also be described as an AC motor drive 21. The motor drive 21 facilitates the control over the motor 14 to move the crane 200. The motor drive 21 collects data from the control inputs 31 and from the sensor 26 to facilitate this control over the motor 14. The motor drive 21 can receive power from the power source 24.

Also included is a processing unit 20 operatively connected to the motor 14 and the variable frequency drive 16. The processing unit 20 converts the output vector 22 to an amount of voltage, an amount of current, and a frequency. The processing unit 20 can also instruct the variable frequency drive 16 to transfer a level of voltage, a level of current, and a frequency level from the variable frequency drive 16 to the motor 14. This transfer occurs to maintain the frequency, and in some cases the amount of voltage and the amount of current, in the motor 14 as read by the processing unit 20. Alternating current voltage exists at some frequency, so the system needs to know what frequency to apply the voltage to the rotating motor. The system 10 will provide the active frequency in the motor from the variable frequency drive 16 substantially equal to the frequency within the motor 14.

The velocity vector 12 of the crane 200 includes a traverse direction and a speed. The traverse direction can be either direction along the span 202 of the bridge 200. The speed can be limited by predetermined speed limits within the processing unit 20.

The system 10 further includes a sensor 26, preferably a shaft encoder, operatively connected to the motor 14 and to the variable frequency drive 16. The sensor 26 provides an electronic signal (vector signal 48) to the processing unit 20. The electronic signal contains information about the rotational speed and direction (output vector) of the motor shaft 15. This information can then be converted by the processing unit 20 to an amount of voltage, an amount of current, a frequency, the voltage polarity, and the current direction presently in the motor 14 at a given point in time. The sensor 26 is aligned on the shaft 15 of the motor 14 to gather the input data, or feedback, for the processing unit 20. In a preferred embodiment, the sensor 26 provides the electronic signal every 2 milliseconds.

Figure 2:
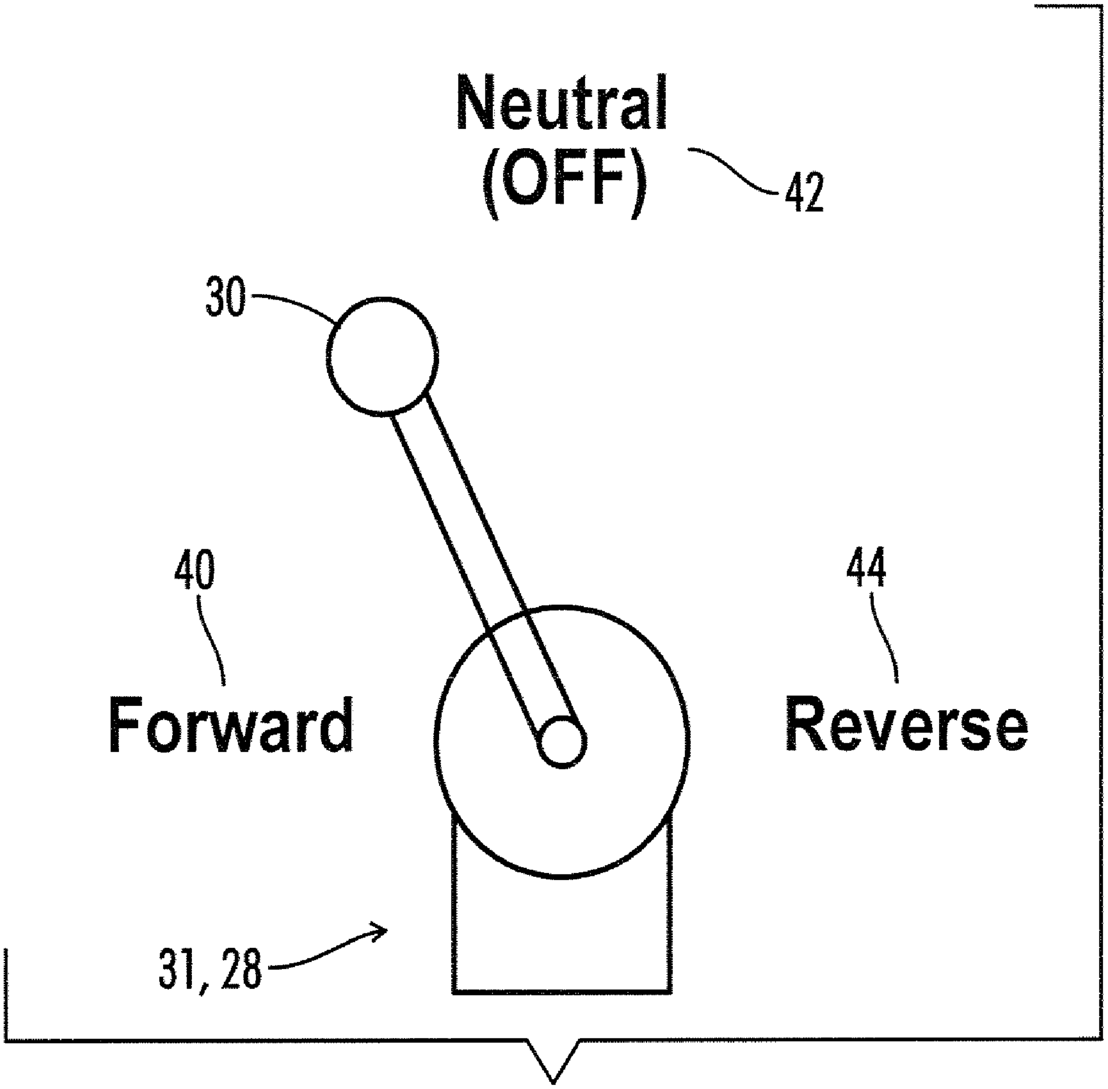
FIG. 2 is a schematic representation of one embodiment of a control (or master) switch used in conjunction with the system of FIG. 1.
Figure 3:
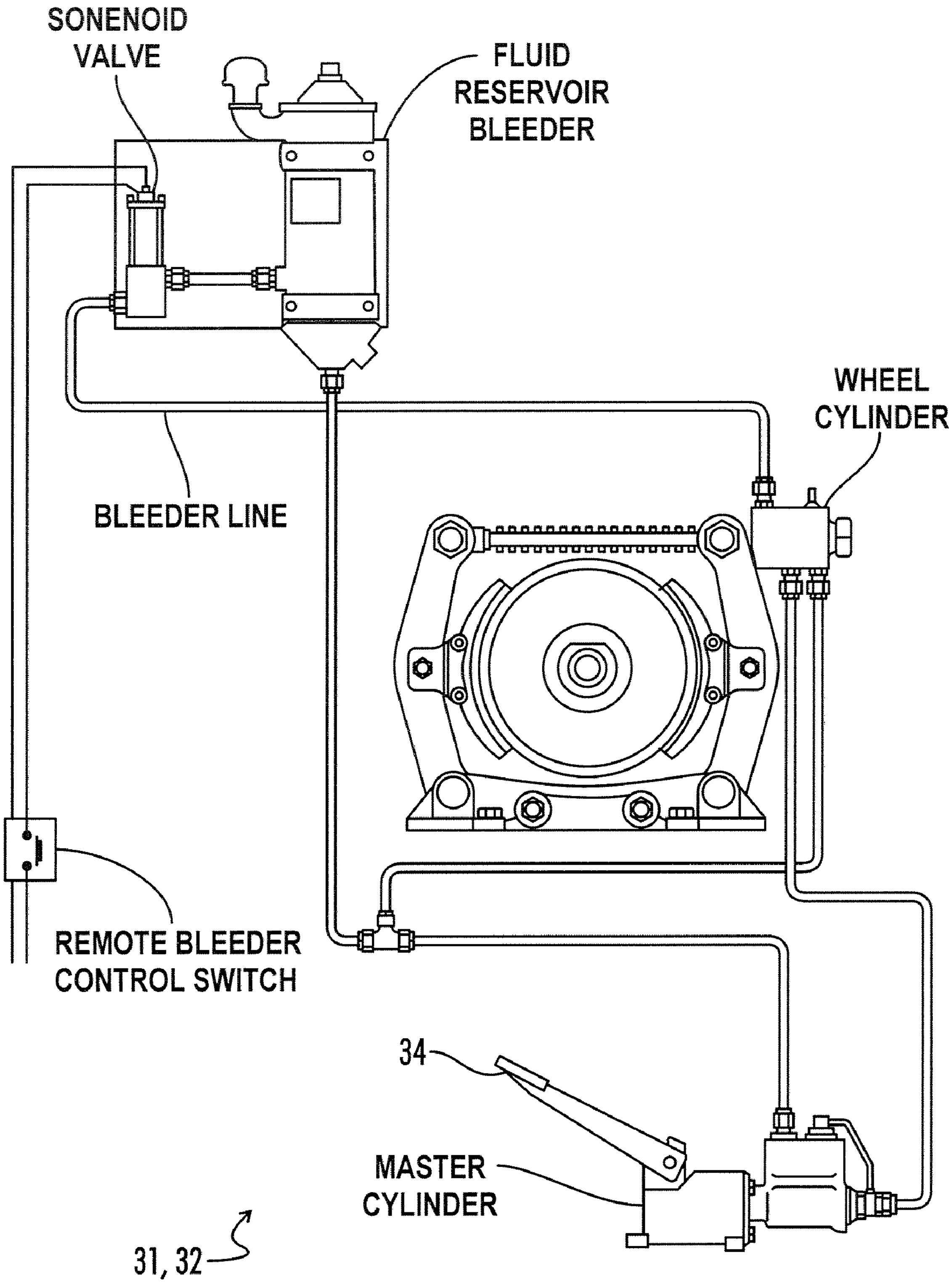
FIG. 3 is a schematic representation of a hydraulic brake used in conjunction with the system of FIG. 1.

The system 10 further includes a control switch 28, also called a master switch 28, operatively connected to the processing unit 20 to regulate the velocity vector 12 of the crane 200. The positioning of the control switch 28 determines the level of voltage and the level of current generated in the variable frequency drive 16 for transfer to the motor 14. For example, as seen in FIG. 2, one embodiment of the control switch 28 has a neutral position located in what can be described as a 12 o'clock position. A counterclockwise rotation of the handle 30 of the control switch would move the crane 200 in one direction which can be described as a forward direction. A clockwise rotation of the handle 30 can move the crane in a second direction, or opposite direction, which can be described as a reverse direction.

The degree of the rotation of the handle 30 can directly correlate the amount of power sent to the motor 14, and torque generated therein, to determine the acceleration and speed of the crane 200 in either direction. Depending on the orientation of the user (not shown) of a crane 200 a "forward" or "reverse" direction can be either direction along the linear length of the span 202 of the overhead crane 200. Other embodiments of the control switch 28 can include other knobs, handles, buttons, dials, slides, and the like, known in the art to send output to a processing unit.

A brake 32 is also included and is operatively connected to the crane 200, the motor 14, the processing unit 20, and the variable frequency drive 16. The brake 32 also regulates the velocity vector 12 of the crane 200. In a preferred embodiment, the brake 32 is a manual hydraulic foot brake and includes a brake pedal 34 and a brake switch sensor 36. The brake sensor 36 is attached to the brake 32 to determine when the brake 32 has been activated by the user of the crane 200. The brake sensor 36 then sends an electronic signal to the processing unit 20 to indicate that the brake 32 has been activated. Alternate embodiments of the brake 32 can include those brakes known in the art to decelerate cranes.

Once a crane 200 is in motion, the control switch 28 can be moved to a neutral position allowing the crane 200 to coast. The crane 200 will continue to coast until one or all of the following occur; mechanical friction and wind resistance will eventually stop the motion over time; the operator of the crane 200 applies the brake 32; or the operator of the crane activates the control switch 28 to apply torque in the opposite direction from which the crane is coasting (reverse plugging).

FIGS. 1–6 show an overhead crane 200 including a traveling bridge 204, a crane master switch 28, an electric motor 14, and a motor drive 21. The motor drive 21 can include a variable frequency motor drive 16 and a processing unit 20. The traveling bridge 204 is moveable by a speed and a direction defining a crane velocity vector 12. The crane master switch 28 is adapted to allow a user of the crane 200 to selectively control the velocity vector 12. The master switch 28 includes forward position 40, neutral position 42, and reverse position 44 as depicted in FIG. 2. The motor 14 has a rotating motor shaft 15 operatively coupled to the traveling bridge 24. The motor 14 is operable at variable shaft speeds and directions defining a motor output vector 22.

The variable frequency motor drive 16 of the motor drive 21 has a drive output 17 electrically coupled to the motor 14 to provide an operating voltage and current for the motor 14. The variable frequency motor drive 16 also includes an output vector input 46 electrically coupled to the motor 14 to receive an output vector signal 48 corresponding to the motor output vector 22. Included in the variable frequency motor drive 16 is a master switch input 50 electrically connected to receive a master switch control signal 52 from the master switch 28. The variable frequency motor drive 16 also includes a brake input 54 electrically connected to receive a brake control signal 56 from the brake 32.

In this embodiment, the variable frequency motor drive 16 includes a processing unit 20 that is responsive to the master switch control signal 52 and the output vector signal 48 to control the motor operating voltage and current. The processing unit 20 is further responsive to the master switch control signal 52 to provide a speed match. The speed match is accomplished by adjusting the motor operating voltage, current, and frequency to match the motor output vector 22 when the master switch 28 is moved from the neutral position 42 to either the forward position 40 or the reverse position 44.

The overhead crane 200 further includes a shaft sensor 26. The shaft sensor 26 senses the motor shaft speed and direction and provides the output vector signal 48 to the output vector input 46. This information allows the processing unit 20 to match the frequency, velocity and current presently in the motor 14 to the desired frequency, velocity and current as inputted from the master switch 28.

The master switch controls the signal 52 from the master switch 28 includes a run command signal and a variable torque reference signal. The processing unit 20 is responsive to the variable torque reference signal to control acceleration and deceleration of the motor 14.

A user of the system 10 can control the speed and direction of the crane 200 through the manipulation of the control switch 28 and the brake 32. Activation and/or movement of the control switch 28 sends a signal to the processing unit 20 of the desired direction and speed of the user. Also, the brake 32 can be activated by the user to decelerate the crane and, as such, send a signal to the processing unit 20. The control switch 28 and brake 32, which can also be described as input devices 31, or control inputs 31, provide the input information in the form of a direction and speed to the processing unit 20. The input information is converted by the processing unit 20 into a level of voltage, a level of current, and a frequency.

The processing unit 20 also receives feedback from the sensor 26 located on the motor 14. This feedback provides information in the form of an output vector 22. The output vector is comprised of the rotational direction and the rotational speed of the motor 14. The rotational direction and the rotational speed of the motor 14 can be converted into a present amount of voltage, current, and frequency within the motor 14.

The processing unit 20 then compares output vector 22 or, more specifically, the present velocity of the motor 14, as obtained from the sensor 26 located on the motor 14, to the desired direction and speed of travel or, more specifically, the level of voltage, the level of current and frequency level from the input devices 31. The processing unit 20 can convert the output vector 22, or present velocity of the motor 14, into the present amount of voltage, current, and frequency within the motor 14.

The processing unit 10 then allows the variable frequency drive 16 to send the desired level of voltage and current to the motor 14. This occurs with minimal stress to the motor 14 because the variable frequency drive 16 will continuously provides a voltage level to the motor 14 that substantially matches the frequency of the voltage presently in the motor 14, which in turn reduces the current spikes caused by starting at unmatched frequencies.

Figure 5:
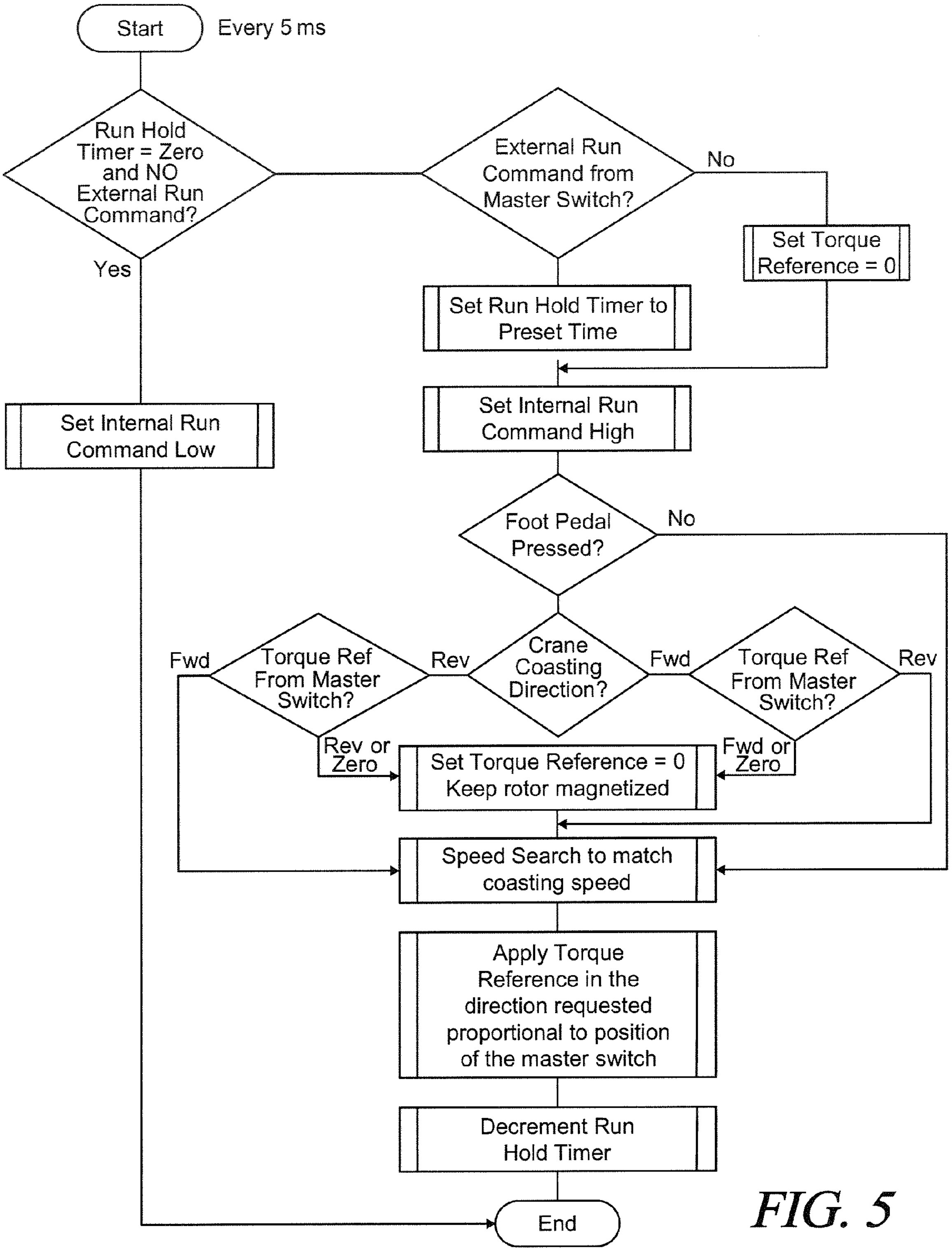
FIG. 5 is a logic flow chart diagram characterizing the functionality of one embodiment of the software associated within the processing unit of the present invention.
Figure 6:
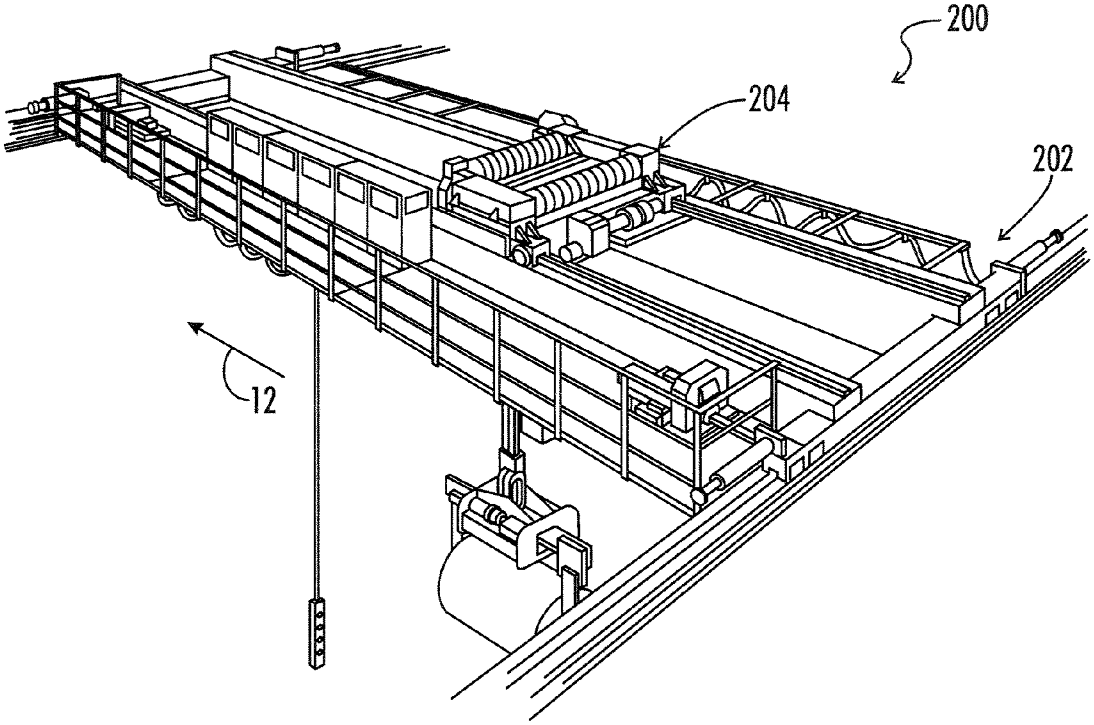
FIG. 6 Prior Art
FIG. 6 is a perspective view of one embodiment of an overhead bridge crane.
Figure 7:
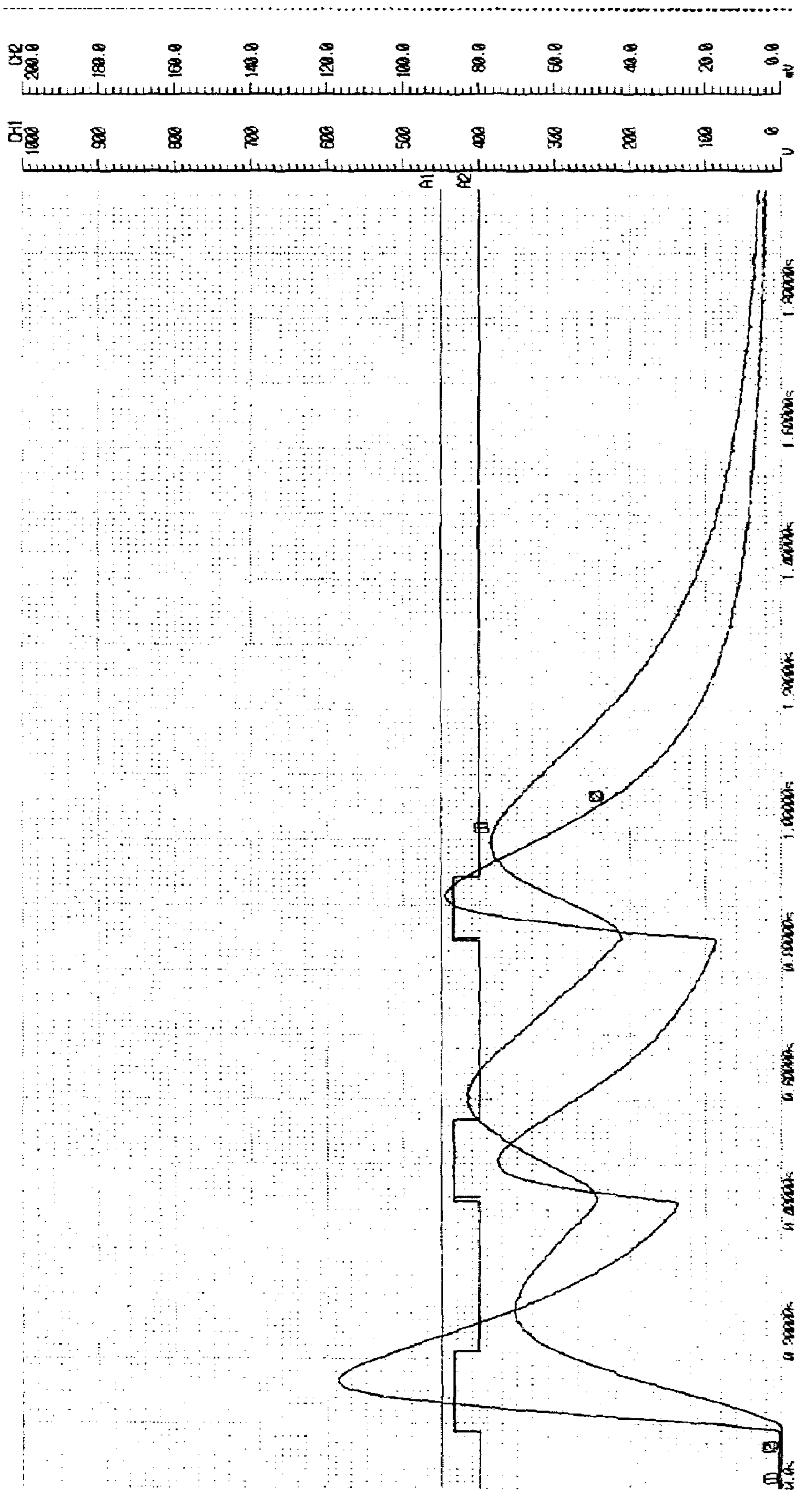
FIG. 7 is a graphical representation of conventional voltage and current spikes associated with supplying a voltage and current with the same polarity as the voltage and current present within a motor rotating in a given direction.
Figure 8:
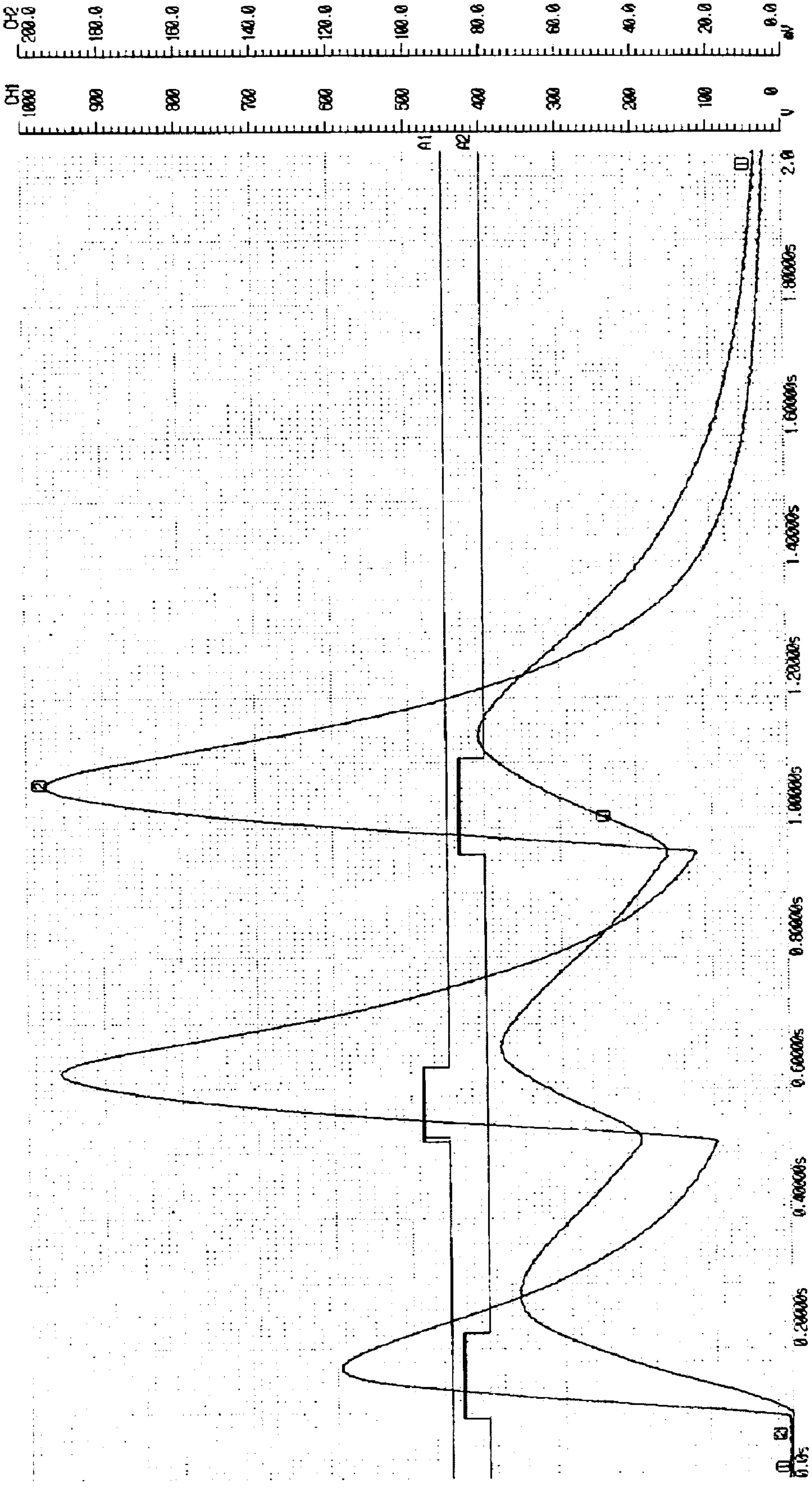
FIG. 8 is a graphical representation of conventional current and voltage spikes associated with supplying a reversed plurality voltage and current to a motor traveling in a given direction.
Figure 9:
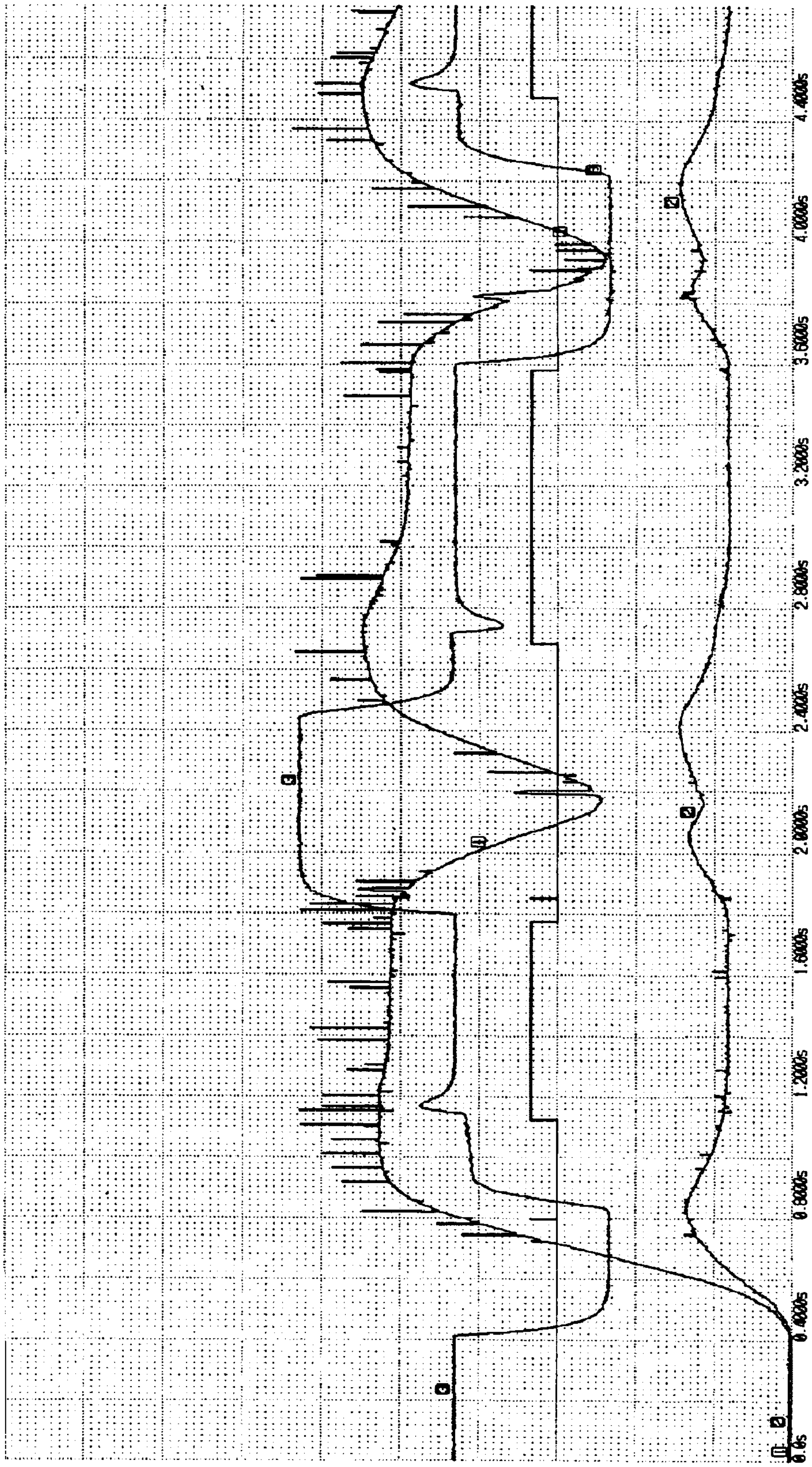
FIG. 9 is a graphical representation of the voltage current spikes of one embodiment of the current invention when a voltage and a current are applied to a motor containing a voltage and current with an opposite polarity.

FIG. 5 shows a flow diagram of the basic logic of software of the processing unit 20. In a preferred embodiment, an input reading, including all the input variables, is taken every 5 milliseconds. The input variables come from the motor 14 or, more specifically, the sensor 26 on the shaft 15 of the motor 14, the control switch 28, and the brake 32. The processing unit 20 first checks to see if the motor currently possesses a velocity vector 12 and if there are any commands from the input devices 31. If not, the internal run command of the processing unit 20 is set at the lowest level and that sequence of the process is over.

Next, the processing unit 20 analyzes the input from the control inputs separately. If the input is from the control switch 28, i.e. a user of the crane 200 is trying to accelerate or decelerate using the control switch 28, the input is converted to an amount of torque and a run command timer is initiated. The internal parameters of the processing unit 20 are then set at a high command indicating manipulation of the operating speed and/or direction of the crane is about to occur. The timer holds the run command in an "on", or activated, state to help insure the motor stays magnetized while the crane maybe coasting.

Next, the processing unit 20 looks to see if the brake 32 is engaged. If not, the processing unit 20 sets the variable frequency drive 16, more specifically the frequency of the voltage level sent to the motor 14, to match the existing direction and speed of the crane 200 or, more specifically, to match the frequency of the rotating motor 14.

If the brake 32 is activated, the processing unit 20 receives input from the motor 14 to determine which direction the crane 200 is moving. The processing unit 20 also receives input from control switch 28 to determine the desired direction of movement as indicated from the control switch 28. If the crane 200 is moving in the same direction as the input from the control switch 28 when the brake 32 is applied, the processing unit 20 reads this combined input as a desire by the operator of the crane 200 to slow or stop the crane. As such the processing unit 20 will reduce the input from the variable frequency drive 16 to the motor 14 such that the torque within the motor 14 is zero. However, if the crane is coasting in one direction and the input from the control switch 28 reads as though the operator of the crane 200 wishes to move the crane 200 in the opposite direction, the processing unit 20 reads this as an attempt to quickly decelerate, or reverse plug, the crane 200.

Either way the processing unit 20 sends the level of current, level of voltage, and the corresponding torque, all at a given coasting frequency, to the motor 14 corresponding to the desired change. This level of current, voltage, frequency and corresponding torque is sent from the variable frequency drive 16 to the motor 14 to change the velocity vector 12 of the crane 200. These control of the input sent from the variable frequency drive 16 to the motor 14 by the processing unit 20 can be described as facilitating brake stand prevention.

Figure 4:
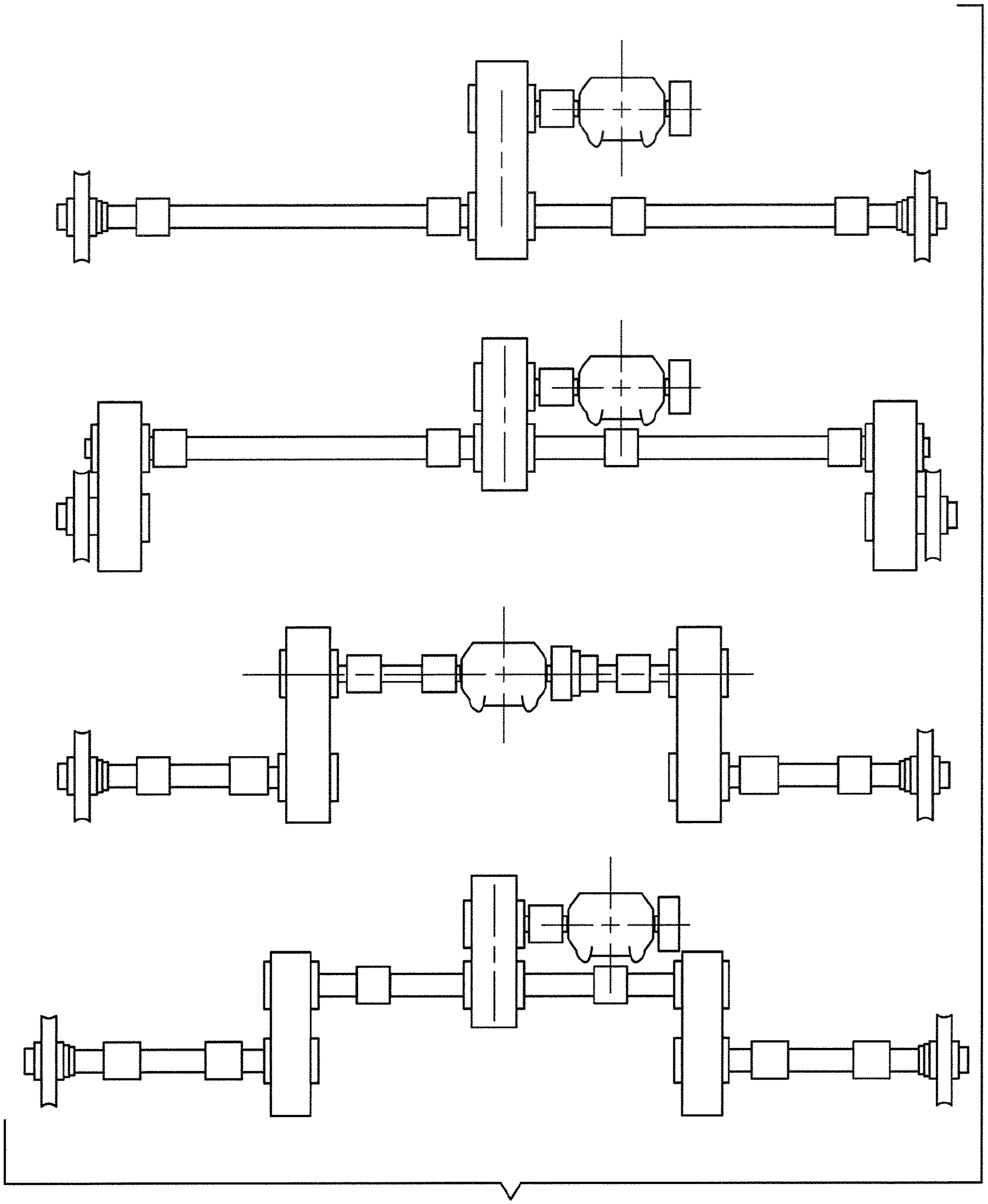
FIG. 4 schematically illustrates typical arrangements of the mechanical drive system components of a crane bridge.

FIG. 4 shows possible configurations for the mechanical linkage of the system used to connect the system 10 with the crane 200. FIG. 4 includes possible motor and transmission alignments to operate the crane.

Methods

A method of using a motor to control the direction of movement and the velocity of an overhead bridge crane is also disclosed. The motor includes a rotational direction and a rotational speed. The method includes determining the direction of movement and velocity of the crane by monitoring the rotational direction and rotational speed of the motor. Next, the method includes converting the rotational direction and the rotational speed of the motor to the amount of voltage, the amount of current, and the frequency of the voltage presently within the motor. This step can also include using the rotational direction and rotational speed to determine the amount of torque currently contained within the motor. The method also includes regulating a level of voltage and a level of current sent to the motor to control the direction of movement and the velocity of the crane.

In a preferred embodiment, the method includes, continuously corresponding the frequency of the voltage sent to the motor to the frequency presently within the motor. This step basically matches the frequency level and the corresponding amount of torque that is sent to the motor to the frequency and corresponding amount of torque within the motor. This facilitates the smooth transfer of power to the motor and controls the direction of movement and velocity of the crane. This type of voltage, current, frequency and corresponding torque transfer reduces the wear and tear on the motor, drive train, and crane. The matching of these items can occur whether the user of the crane decides to accelerate or decelerate.

The program and software or processing unit can be used to control the level of power emanating from a variable frequency drive, or other similar drive unit, in order to facilitate the smooth transfer of power to the motor. This transfer of current, voltage, frequency and corresponding torque to the motor facilitates the reduction or increase of output from the motor, and the resulting change of movement of the crane. As a result, the crane can smoothly accelerate or decelerate accordingly.

The method can also include the application of a brake to vary the velocity of the crane. A control switch can also be used to gather input from a user of the crane to determine the desired changes in the direction and speed of the crane. These desired changes can be converted into a level of voltage and a level of current in which can be transferred to the motor. A processing unit, or software, can be used to gather input from the brake and the control switch to convert these input items to current, voltage, frequency and corresponding torque, which can then be applied to the motor to facilitate movement and changes in movement of the crane.

One method include herein, keeps the rotor of the motor magnetized during the operation of the crane to prevent open circuit voltage decay. This continued magnetization can be while the crane is coasting, or when an operator provides additional input in the form of applying a brake. The variable frequency drive will essentially only transfer enough voltage to the motor to keep the motor magnetized, also referred to as the "no load current" of the motor, for a period of time programmed by a parameter in the software. The software or programming unit can vary the voltage sent to the motor, and the frequency of that voltage, as the energy in the motor is depleted by wind resistance, friction, or other forces that act on the crane to slow the crane down. This eliminates the need to wait for the voltage to decay over a period of time (determined by the characteristics of the motor being used) before adjusting the input to the motor. Since the rotor is magnetized, the coasting speed is known, the system response is improved, include lag time in the controls.

Also included is a method of preventing a motor from driving into a brake when the brake is applied to slow an overhead bridge crane, which can be referred to as brake stand prevention. When the crane is traveling in a given direction and the motor has a torque input from a variable frequency drive, the method teaches determining the direction of movement of the crane and the torque input into the motor. The method then includes determining if the brake is being applied. If it is, the method will set the torque input to approximately zero when the torque input is driving the motor in the same direction as the crane is traveling.

For example, if the crane is traveling forward and the torque input into the motor is turning the motor to drive the crane in that same direction, the torque input will be set at zero when the brake is applied. This keeps the operator of the crane from powering the motor into the brake—i.e. the operator cannot have the accelerator on go while he has the brake on stop. The method will eliminate the torque input into the motor and apply the brake to slow the crane.

Thus, although there have been described particular embodiments of the present invention of a new and useful Control for an Overhead Bridge Crane, it is not intended that such references be construed as limitations upon the scope of this invention except as set forth in the following claims.

What is claimed is:

1. A system for controlling a velocity vector of an overhead crane, comprising:

- a single motor engaging the overhead crane to move the overhead crane and having an output vector;
- a variable frequency drive operatively connected to the single motor to transfer a level of voltage, a level of current, and a frequency level for operation of the single motor;
- a processing unit operatively connect to the single motor and the variable frequency drive; and
- wherein the processing unit converts the output vector to an amount of voltage, an amount of current, and a frequency and maintains the frequency level transferred from the variable frequency drive to the single motor substantially equal to the frequency in the single motor to maintain the velocity vector of the overhead crane.

2. The system of claim 1, where the output vector includes a rotational direction and a rotational speed.

3. The system of claim 2, further including a sensor operatively connect to the single motor and the variable frequency drive, wherein the sensor converts the output vector to an electronic signal and sends the electronic signal to the processing unit.

4. The system of claim 1, wherein the velocity vector includes a traverse direction and a speed.

5. The system of claim 1, further including:

- a control switch operatively connected to the processing unit to regulate the velocity vector of the crane; and
- a brake operatively connected to the crane, the single motor, and the variable frequency drive to regulate the velocity vector of the crane.

6. The system of claim 5, wherein the positioning of the control switch determines the level of voltage and the level of current transferred from the variable frequency drive to the single motor.

7. The system of claim 5, wherein the hydraulic brake is a manual hydraulic foot brake.

8. A system for controlling a direction of movement and a velocity of an overhead bridge crane, comprising:

one motor attached to the crane, having an output vector, and positioned to move the overhead crane proportional to the output vector;

a variable frequency drive operatively connected to the motor, and positioned to transfer a level of voltage, a level of current, and a frequency level to the motor;

a control switch operatively connected to the variable frequency drive to regulate the direction of movement and the velocity of the crane;

a hydraulic brake operatively connected to the motor and the variable frequency drive to decrease the velocity of the crane;

a processing unit operatively connected to the motor and the variable frequency drive;

wherein the processing unit converts the output vector to an amount of voltage, an amount of current, a traverse direction, and frequency and maintains the frequency level transferred from the variable frequency drive to the motor substantially equal to the frequency in the motor to maintain the velocity vector of the overhead bridge crane; and wherein positioning of the control switch varies the level of voltage and the level of current transferred by the variable frequency drive to the motor to control the direction of movement and velocity.

9. A method of using a motor having a rotational direction and a rotational speed to control the direction of movement and the velocity of an overhead bridge crane, comprising:

a) determining the direction of movement and velocity of the crane by monitoring the rotational direction and the rotational speed of the motor;

b) converting the rotational direction and rotational speed of the motor to an amount of voltage, an amount of current, and a frequency;

c) substantially corresponding a frequency level sent to the motor to the frequency in motor to maintain the direction and velocity of the overhead bridge crane;

d) regulating a level of voltage and a level of current sent to the motor to control the direction of movement and the velocity of the crane.

10. The method of claim 9, wherein step c) occurs before step d).

11. The method of claim 10, further including step e) of using a manual brake to varying the velocity of the crane.

12. The method of claim 9, wherein step c) further includes positioning a control switch to determine the level of voltage and the level of current transferred to the motor.

13. A method of smoothly adjusting the velocity of an overhead bridge crane, comprising:

a) providing a motor and a variable frequency drive operatively connected to the motor;

b) determining an amount of voltage, an amount of current, and frequency in the motor and a conversion level of voltage, a conversion level of current, and a conversion frequency level sent from the variable frequency drive to the motor;

c) maintaining the conversion frequency level transferred from the variable frequency drive substantially equal to the frequency of the motor to maintain the velocity of the overhead bridge crane;

d) converting a desired velocity of the crane to a desired amount of voltage and a desired amount of current; and e) adjusting the level of voltage and the level of current in the motor to the desired amount of voltage and the desired amount of current.

14. An overhead crane comprising:

a traveling bridge movable with a speed and a direction defining a crane velocity vector;

a crane master switch adapted to allow a user of the crane to selectably control the crane velocity vector, the master switch including forward, neutral, and reverse positions;

an electric motor having a rotating motor shaft operatively coupled to the traveling bridge, the motor operable at variable shaft speeds and directions defining a motor output vector;

a variable frequency motor drive having a drive output electrically coupled to the motor to provide operating voltage and current for the motor, an output vector input electrically coupled to the motor to receive an output vector signal corresponding to the motor output vector, and a master switch input electrically connected to receive a master switch control signal from the master switch;

the variable frequency motor drive including a processing unit, the processing unit responsive to the master switch control signal and the output vector signal to control the motor operating voltage and current; and the processing unit further responsive to the master switch control signal to provide a speed match before adjusting the motor operating voltage and current to match the motor output vector when the master switch is moved from the neutral position to either of the forward or reverse positions.

15. The overhead crane of claim 14 further comprising a shaft sensor operative to sense the motor shaft speed and direction and to provide the output vector signal to the output vector input.

16. The overhead crane of claim 14 wherein the master switch control signal includes a run command signal and a variable torque reference signal.

17. The overhead crane of claim 16 wherein the processing unit is responsive to the variable torque reference signal to control acceleration and deceleration of the motor.

18. The overhead crane of claim 14 further comprising a hydraulic crane brake;

a crane brake control, the crane brake control operative to control the hydraulic crane brake;

the crane brake control including a brake switch responsive to movement of the crane brake control to generate a crane brake activation signal;

the motor drive having a brake control input electrically coupled to the brake switch; and the processing unit further responsive to the crane brake activation signal, the master switch control signal, and the output vector signal to prevent the motor from driving the crane bridge against the hydraulic brake.

19. A control system for a crane, the crane having a master switch control signal and a motor with an operating voltage, an operating current, an operating frequency and an output vector signal, the control system comprising:

a motor drive having a drive output adapted to electrically control the motor, an output vector input adapted to receive the output vector signal, and a master switch input adapted to receive the master switch control signal;

the motor drive including software responsive to the master switch control signal and the output vector signal and adapted to control the operating voltage and operating current;

the software further adapted to provide a speed match by adjusting the operating frequency and operating voltage to match the output vector signal before the master switch control signal changes; and a sensor adapted to transfer the output vector signal to the output vector input.

20. A method of substantially eliminating the open circuit voltage decay of a motor of an overhead bridge crane, the motor having a present voltage at a present frequency, the method comprising:

a) providing a variable frequency drive operatively connected to the motor;

b) determining the present voltage and the present frequency in the motor; and c) transferring a voltage level at a frequency level from the variable frequency drive substantially equal to the present voltage and the present frequency in the motor to keep the motor magnetized and to substantially eliminate the open circuit voltage decay of the motor.

21. A method of preventing a motor from driving into a brake when applied to slow an overhead bridge crane in a direction of movement, the motor having a torque input, the method comprising:

a) determining the direction of movement of the crane;

b) determining the torque input in the motor;

b) determining the application of the brake;

c) setting the torque input to approximately zero when the brake has been applied and the torque input is proportional to the direction of movement; and d) using retarding torque when the brake has been applied and the torque input is opposite to the direction of movement.

22. An overhead crane comprising:

a traveling bridge movable with a speed and a direction defining a crane velocity vector;

a crane master switch adapted to allow a user of the crane to selectably control the crane velocity vector, the master switch including forward, neutral, and reverse positions;

an electric motor having a rotating motor shaft operatively coupled to the traveling bridge, the motor operable at variable shaft speeds and directions defining a motor output vector;

a variable frequency motor drive having a drive output electrically coupled to the motor to provide operating voltage and current for the motor, an output vector input electrically coupled to the motor to receive an output vector signal corresponding to the motor output vector, and a master switch input electrically connected to receive a master switch control signal from the master switch;

the variable frequency motor drive including a processing unit, the processing unit responsive to the master switch control signal and the output vector signal to control the motor operating voltage and current; and the processing unit further responsive to the master switch control signal to provide a speed match before adjusting the motor operating voltage and current to match the motor output vector when the master switch is moved from the neutral position to either of the forward or reverse positions;

a hydraulic crane brake;

a crane brake control, the crane brake control operative to control the hydraulic crane brake;

the crane brake control including a brake switch responsive to movement of the crane brake control to generate a crane brake activation signal;

the motor drive having a brake control input electrically coupled to the brake switch; and the processing unit further responsive to the crane brake activation signal, the master switch control signal, and the output vector signal to prevent the motor from driving the crane bridge against the hydraulic brake.

* * * * *